July 22, 1969  A. SMOLSKI  3,456,358
METHOD OF DRYING CERAMIC PRODUCTS
Filed March 28, 1968
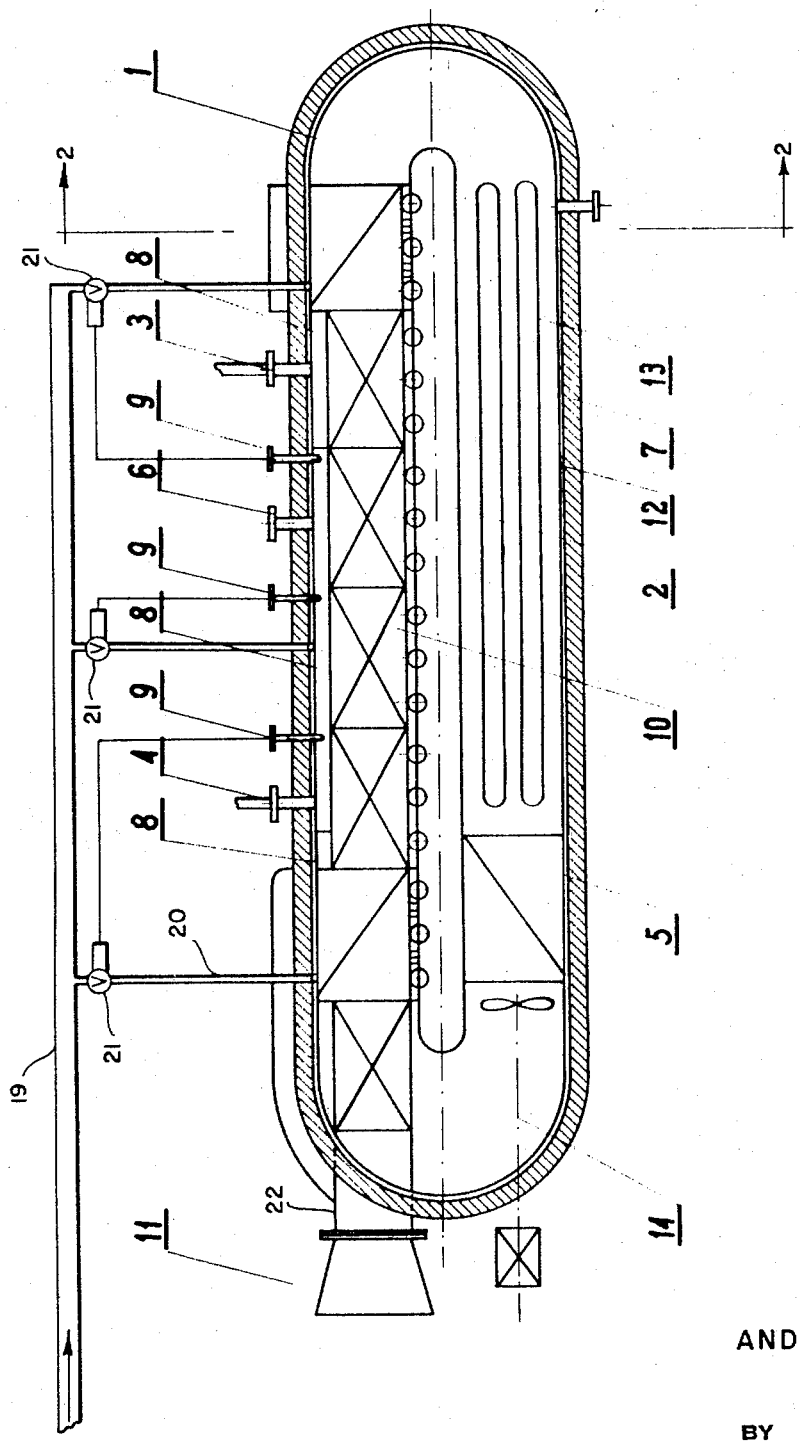
ANDRZEJ SMOLSKI
INVENTOR
BY
*Irvin A. Lavine*
ATTORNEY

3,456,358
METHOD OF DRYING CERAMIC PRODUCTS
Andrzej Smolski, Mickiewicza 37m44, Warsaw, Poland
Continuation-in-part of application Ser. No. 527,121,
Feb. 14, 1966. This application Mar. 28, 1968, Ser.
No. 716,712
Int. Cl. F26b *3/04, 3/32, 15/12*
U.S. Cl. 34—37                                5 Claims

ABSTRACT OF THE DISCLOSURE

A method of drying ceramic products in which the products are placed in an enclosed, heated space, the heat causing removal of moisture from the products and the thus removed moisture providing the water vapor for superheated steam.

Cross reference to related application

This application is a continuation-in-part of application Ser. No. 527,121, filed Feb. 14, 1966, now abandoned.

Background of the invention

The present invention is a method of drying ceramic products which in their wet or uncured state have a substantial moisture content.

Ceramic products such as bricks, tiles, and drainage pipes are shaped from wet clay. Following the shaping process, these products contain up to 40 percent of water, by weight. Before these products can be fired, the water content must be substantially reduced, and the prior art has achieved this by placing the wet ceramic products in a dryer, and then contacting the products with a drying medium in order to evaporate water from the products. In some instances, the drying medium is the product of combustion of a hydrocarbon fuel. Such products of combustion are known to contain a significant amount of water vapor, this being approximately 9 percent by weight. In other methods, heated air is used as the drying medium, to which is added moisture vapor from some source, such as water sprays or a water reservoir.

The rate of drying in the known processes, utilizing a heated gaseous medium as discussed above, is limited by the difference of partial pressures of the gaseous medium over the surface of the ceramic products, and by the drying medium. Consequently as the air temperature increases and the humidity decreases, the partial pressure of the water vapor in the air decreases. In the initial stages of the drying, the air humidity decreases, thereby decreasing the drying rate. As a consequence, in the known processes, temperature of the ceramic product does not increase above about 50 degrees centigrade, and this remains true for nearly the entire drying process. Further, because of the presence of the drying medium, the water vapor generated from or derived from the ceramic product must diffuse into the drying medium, and this also decreases to a significant extent the rate of moisture evaporation from the ceramic products. It will be appreciated that the moisture must evaporate from the surface of the ceramic products, and must travel or migrate from the interior of the ceramic products to their surfaces.

The rate of moisture travel within the ceramic products depends on the temperature of the products, and increases with increase in water viscosity. These factors result in the known drying processes being slow, requiring drying times of up to 144 hours. The average drying time for ceramic products is approximately 72 hours for presently used processes. This results in high construction cost of the equipment. In addition, operating costs are high because of the long drying time now required by the present state of the art.

The known drying processes require an average of between 40 and 60 percent of the total energy consumption of an entire plant. The processes using the least heat are carried out in tunnel dryers, which require 1,000 to 1,400 Kcal. per kilogram of evaporated moisture. The major part of the heat consumed in such processes has been found to be used for the evaporation of moisture. This heat is lost with the evacuated moist medium, and is the most serious and significant cause of heat loss in such drying processes.

In known drying processes, there is sometimes used a multistage process, in which the ceramic product is first subjected to air or hot gas, and is then subjected to such a drying medium to which superheated steam has been added. Such a method does not, however, obtain the maximum drying rate since the action of the superheated steam occurs only for a minimal amount of time, yielding thereby a low drying rate.

Further, with known processes, distortion or breaking occurs to an undesirable extent.

Summary of the invention

The present invention provides for the introduction of wet or uncured ceramic products into a closed space which is heated by heating apparatus which does not introduce moisture into the space. This heat causes moisture within the ceramic products to be evaporated therefrom, and this moisture is converted into superheated steam, which functions as a drying medium. Significantly, substantially all of the moisture is obtained from the ceramic products being dried.

Among the objects of the present invention are the provision of a drying process for ceramic products which will dry the products in a shorter time, will lower construction costs of the apparatus for drying ceramic products and will lower the operating costs. A further object is to diminish the rate of product spoilage.

Brief description of the drawing

The sole figure is a longitudinal section view of a dryer with parts shown schematically, in which the present invention process may be performed.

Description of the preferred embodiment

Referring now to the drawing, there is shown in FIG. 1 a longitudinal section of a tunnel dryer 1 capable of performing the process of the present invention, together with the heating and control system. Within the dryer 1, which provides an enclosed space, there is provided a conveyor or transporter 2 for moving articles to be dried through the dryer. The tunnel dryer 1 may be encased within an insulating layer 7 within which is a heated jacket 12. Jacket 12 may comprise, for example, conduits or passages for a hot fluid, such as water or steam. The hot fluid is supplied from a supply conduit 19, through individual branch conduits 20 which enter the jacket 12 at several spaced inlets 17.

In the lower part of the tunnel dryer 1 there is provided an air heater 5 and an additional heater 13. Circulation oppositely to the direction of movement of the ceramic products 10 within the tunnel dryer 1 is provided by a motor-driven fan 14.

In order to provide for effective control of the atmosphere within tunnel dryer 1, curtains 15 are provided, the curtains 15 being made of suitable heat and moisture resistant material, such as steel, and serving to divide the dryer 1, or that portion of it within which the products are positioned, into separate zones 8, therebeing three such zones shown.

The tunnel dryer 1 is provided with a steam outlet 3 to permit the removal from within it of excess steam. A pressure control valve 4 is provided to insure against excessive pressure within the tunnel dryer 1, and an air intake valve 6 is provided in order to permit the introduction of additional air if required to maintain a satisfactory atmosphere within tunnel dryer 1.

In addition, a number of temperature control devices 9 are provided and each is connected with a control valve 21, each of which is positioned in one of the branch conduits 20. By this latter construction, more or less heating fluid is supplied through the branch conduits 20 to the different regions of the dryer 1 by being supplied to different portions of the jacket 12.

The tunnel dryer 1 is positioned so as to directly receive ceramic products 10 from a machine which has formed such products, the terminal portion of which is designated 11. The machine may be either an extruder or a molding machine, or any other known machine for manufacturing ceramic products. The products 10, at a temperature of about 90° C., enter the dryer 1 through a passage 22 directly connected with the machine, thereby preventing the entry of any significant amount of air into the dryer 1 with the introduction of the products 10.

The products 10 pass through the several zones 8 of the tunnel dryer 1, from left to right as shown in FIG. 1, and are then moved laterally through the side of tunnel dryer 1 on a suitable conveyor 18 through an outlet chamber 16 which prevents the passage of atmospheric air into the tunnel dryer 1. This chamber 16 also prevents the passage of the gas and moisture within the tunnel dryer outwardly through the outlet 16, to any significant extent.

Ceramic products 10 are introduced into the enclosed space provided by the dryer directly from the machine which has made them. The tunnel dryer is heated by the heaters described above, all such heating apparatus being characterized by the fact that they do not introduce moisture into the enclosed space of the dryer. The heat in the enclosed space causes the evaporation of moisture from the ceramic products, and this moisture is converted into superheated steam; in the present process, substantially all of the moisture content of the superheated steam within the enclosed space is obtained from the ceramic products being dried. The drying medium in the enclosed space is circulated, circulation being opposite to the direction of the movement of the ceramic products through the enclosed space. As noted above, the products are introduced directly from the machine which has produced them, so that there is substantially no significant amount of outside air introduced with the ceramic products, and they are placed in the enclosed space at a temperature of approximately 90° C. The enclosed space is divided into zones, the temperatures of which are regulated in accordance with the requirement of the particular product being dried.

The disclosed process provides for a more rapid drying of the ceramic products than has heretofor been achieved, thus enabling the ceramic products to be passed through the drying apparatus in a shorter time. As a consequence, the construction costs of the apparatus for carrying out the process are substantially reduced, as are the operating costs. In addition, ceramic products which have been dried in accordance with the present process have a rate of spoilage less than with presently known processes.

It will be obvious to those skilled in the art that various changes may be made without departing from the spirit of the invention and therefore the invention is not limited to what is shown in the drawings and described in the specification but only as indicated in the appended claims.

I claim:
1. A method of drying a ceramic product which contains moisture comprising;
   placing said product in an enclosed space,
   and supplying heat to said product from a heat source which does not introduce substantially any moisture into said space to thereby generate superheated steam in said space by obtaining substantially all of the moisture content of said superheated steam from said product.
2. The method of claim 1, and further including circulating the atmosphere within said space in relation to the ceramic products therein.
3. The method of claim 1, and further including moving said products through said enclosed space and circulating the atmosphere within said enclosed space oppositely to said products.
4. The method of claim 1, wherein said products are introduced into said enclosed space at a temperature of approximately 90° C.
5. The method of claim 1, and further including the steps of regulating the temperature within different zones of said enclosed space.

References Cited
UNITED STATES PATENTS

| | | | |
|---|---|---|---|
| 1,084,803 | 1/1914 | Jungels | 34—37 |
| 1,727,964 | 9/1929 | Coleman | 34—37 XR |
| 2,575,462 | 11/1951 | Nugey | 25—142 XR |
| 3,255,866 | 6/1966 | Gulde et al. | 25—142 XR |

KENNETH W. SPRAGUE, Primary Examiner